United States Patent [19]
Koizumi

[11] Patent Number: 5,225,909
[45] Date of Patent: Jul. 6, 1993

[54] VIDEO SIGNAL REPRODUCING SYSTEM

[75] Inventor: Shinichi Koizumi, Tokyo, Japan

[73] Assignee: Pioneer Electronic Corporation, Tokyo, Japan

[21] Appl. No.: 690,217

[22] Filed: Apr. 24, 1991

[30] Foreign Application Priority Data

Apr. 25, 1990 [JP] Japan .............................. 2-44712[U]

[51] Int. Cl.$^5$ .............................................. H04N 5/14
[52] U.S. Cl. ..................................... 358/160; 358/143
[58] Field of Search ............... 358/160, 142, 143, 198; 340/725; 84/464 R

[56] References Cited
U.S. PATENT DOCUMENTS 5,083,064 1/1992 Jones, Sr. ........................ 340/815.11

*Primary Examiner*—Alvin E. Oberley
*Assistant Examiner*—Minsun Oh
*Attorney, Agent, or Firm*—Nikaido, Marmelstein, Murray & Oram

[57] ABSTRACT

A video signal reproducing system has a video memory for storing a video signal fed from a source, a memory controller for controlling production of a video signal stored in the video memory, and a display for reproducing a video signal produced from the video memory. Level of an audio signal applied to the display is detected. A detected level is compared with a reference value. A change signal is produced when the detected level is higher than the reference value. In response to the change signal, a video signal stored in the video memory is produced for the reproduction thereof.

5 Claims, 5 Drawing Sheets

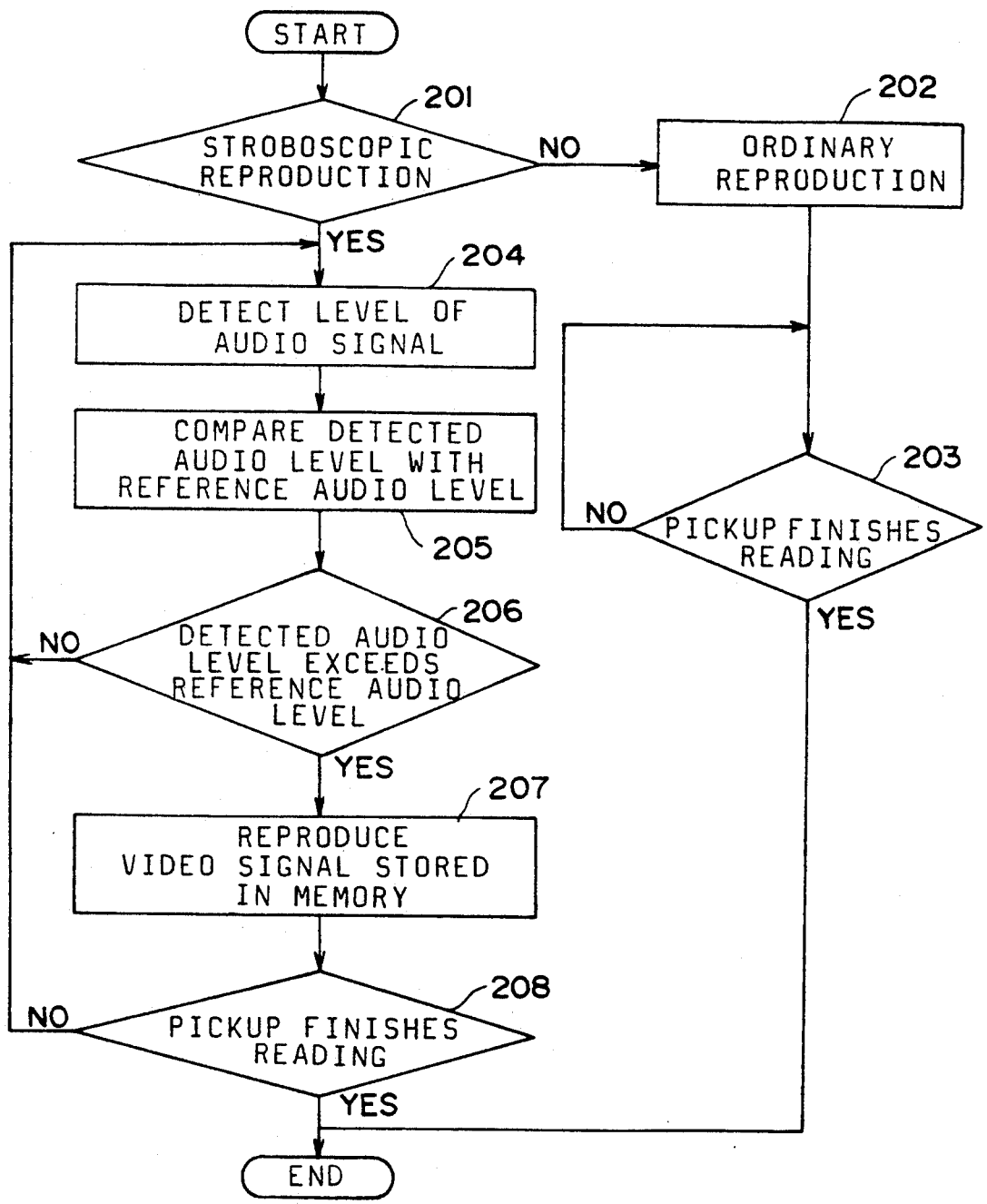

VIDEO SIGNAL REPRODUCING SYSTEM

BACKGROUND OF THE INVENTION

The present invention relates to a video signal reproducing system where a video signal from recording means such as a laser disk and video tape can be reproduced on a display in stroboscopic motion.

Due to the recent technological progress in the field of digital signal process, it has become possible to reproduce video signals in special modes so as to provide a stationary picture or to feed intermittently frames. These special modes can be realized by storing a video signal read from the recording medium in a digital frame memory and controlling the output thereof.

FIG. 6 shows an example of a conventional video signal reproducing system. A video signal read by a pickup (not shown) is fed to an ordinary terminal 1 for an ordinary reproduction. With stroboscopic motion, the video signal is stored in a digital frame memory 2, and applied to a stroboscopic effect terminal 3. A changeover switch 4 for selectively connecting a display 5 with the ordinary terminal 1 and the stroboscopic effect terminal 3 is provided. An audio signal is applied to the display 5 through an audio signal input terminal 8.

The digital frame memory 2 is controlled by a memory controller 6 in accordance with time preset in a timer 7. A new video signal corresponding to one frame is written in the memory when the set time elapses. Thus stationary picture displayed on the display 5 changes at every set time. The system is useful in creating a certain mood in an entertaining environment or when editing videotape.

However, since the image changes at regular intervals irrespective of the music which accompanies the images, the picture is not particularly impressive.

SUMMARY OF THE INVENTION

The object of the present invention is to provide a video signal reproducing system where an impressive pictorial image is reproduced on a display.

According to the present invention, there is provide a video signal reproducing system having a video memory for storing a video signal fed from a source, memory control means for controlling production of a video signal stored in the video memory, and a display for reproducing a video signal produced from the video memory.

The system comprises detector means for detecting level of an audio signal, comparator means for comparing a level detected by the detector means with a reference value and for producing a change signal when the detected level is higher than the reference value, the memory control means being responsive to the change signal for producing a trigger signal, and the video memory being responsive to the trigger signal for changing the produced video signal to a new video signal.

In an aspect of the invention, a changeover switch is provided for changing the video signal from the video memory to a video signal directly fed from the source. The audio signal may be an audio signal applied to the display, related to the video signal.

The other objects and features of this invention will become understood from the following description with reference to the accompanying drawings.

BRIEF DESCRIPTION OF DRAWINGS

FIG. 2 is a flowchart showing the operation of the video signal reproducing system shown in FIG. 1;

DETAILED DESCRIPTION OF THE PREFERRED EMBODIMENTS

Figure 1:
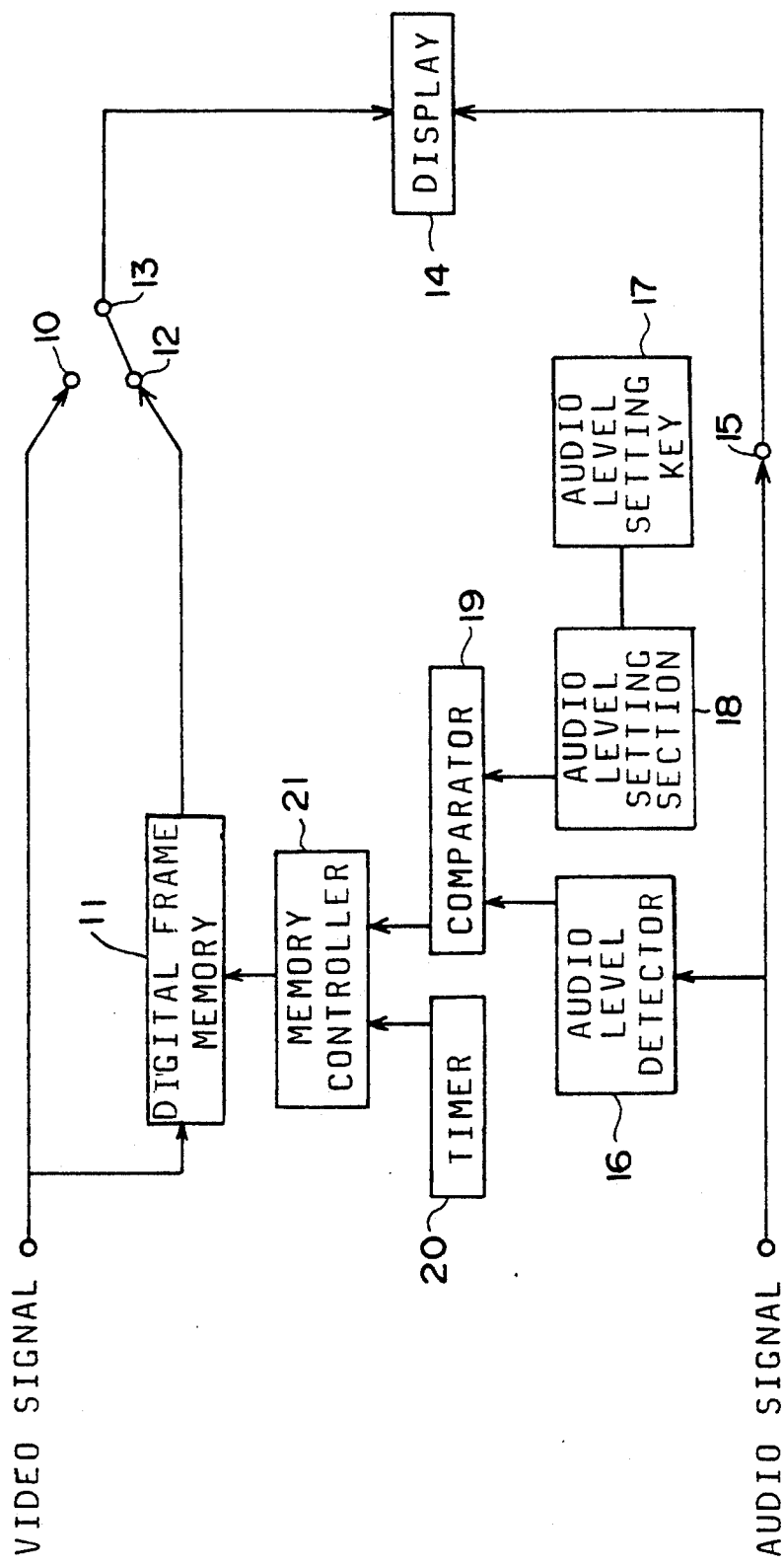
FIG. 1 is a schematic diagram showing a video signal reproducing system of the present invention.

Referring to FIG. 1, a video signal reproducing system of the present invention has an ordinary terminal 10 for applying a video signal read out through a pickup (not shown) from a laser disk or videotape, and a stroboscopic reproduction terminal 12 for applying a one frame video signal stored in a digital frame memory 11 in order to provide stroboscopic effect. The digital frame memory 11 stores a video signal frame by frame. The ordinary terminal 10 and the stroboscopic reproduction terminal 12 are connected through a changeover switch 13 to a display 14 on which a video signal is reproduced. The changeover switch 13 has a movable contact which is selectively connected with the ordinary terminal 10 and stroboscopic reproduction terminal 12.

The video signal reproducing system further has an audio signal input terminal 15 through which an audio signal is fed to the display 14. The audio signal is further applied to an audio level detector 16 for detecting the level of the audio signal applied to the terminal 15. An audio level setting section 18 is provided to determine a reference audio level which is set by operating an audio level setting key 17. The audio level detector 16 may be provided with a low-pass filter, or bandpass filter or high-pass filter in an input section for detecting sounds of the percussion such as sounds of drums, and cymbals. The audio level detected by the audio level detector 16 and the reference audio level from the level setting section 18 are fed to a comparator 19 to be compared with each other. Whenever the detected audio level exceeds the reference level, a signal is applied to a memory controller 21 which in turn applies a trigger pulse to the digital frame memory 11.

A timer 20 which is connected to the memory controller 21 is provided to control the stroboscopic effect in accordance with a set time instead of the level of the audio signal. Namely, when the audio level setting key 17 is operated to release the reference audio level set by the setting section 18, the timer 20 applies a signal to the memory controller 21 which generates a trigger pulse.

The operation of the video signal reproducing system is described hereinafter with reference to FIGS. 2, 3a and 3b.

Referring to FIG. 2, at a step 201, it is determined whether the ordinary reproduction or the stroboscopic reproduction is selected. When the ordinary reproduction is selected, the changeover switch 13 is operated to connect the movable contact thereof with the ordinary terminal 10. Thus, the video signal is directly fed to the display 14, thereby reproducing the video signal in the ordinary manner (step 202). The operation is continued until it is determined at a step 203 that the pickup has finished reading the video signals. During the operation, the audio signal is input to the display 14 through the audio signal input terminal 15.

When it is determined at the step 201 that the stroboscopic reproduction is selected, the changeover switch 13 is connected with the stroboscopic reproduction terminal 12. The audio level detector 16 detects the level of the audio signal at a step 204. At a step 205 the detected audio level is compared by the comparator 19 with the reference audio level set at the audio level setting section 18 by operating the setting key 17. When it is determined at a step 206 that the level of the detected audio level is higher than the reference level, the memory controller 21 applies a trigger pulse to the digital frame memory 11. A one frame video signal stored in the memory 11 is fed to the display through the stroboscopic reproduction terminal 12, thereby showing a stationary picture on the display 14 at a step 207. The program returns to the step 204 until a step 208 determines that the pickup finishes reading the video signal. In a subsequent program, when a next trigger pulse generates at step 206, a new video signal stored immediately before the next trigger pulse is reproduced at step 207.

Figure 3A:
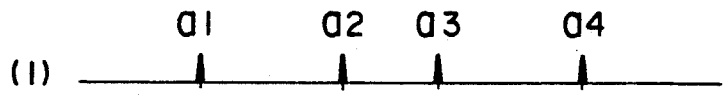
FIGS. 3a and 3b are timecharts explaining timing of stroboscopic motion in the system.
Figure 3B:
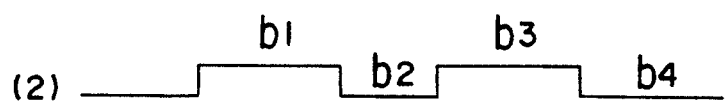

FIGS. 3a and 3b show trigger pulses a1, a2 . . . , and the change of the stationary pictures b1, b2 . . . in accordance with the above described program.

When the reference audio level is not set by operating the audio level setting key 17, the image changes with the set time of the timer 20. Namely, when a set time elapses, the memory controller 21 feeds a trigger pulse to the memory. Thus, the memory 11 feeds a new video signal stored therein to the display 14.

If the audio level detector 16 has a filter for detecting musical sounds as described above, the image is changed only by sounds of the percussion.

Hence in accordance with the present invention, the stroboscopic effect is obtained in accordance with the level of the audio signals. Therefore, the image on the display 14 changes, for example, with the rhythm of the music thereby giving a greater impact on the viewer.

Figure 4A:
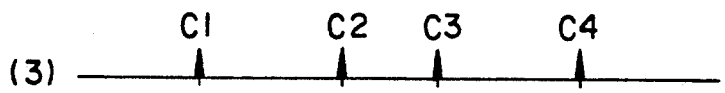
FIGS. 4a to 4c are timecharts explaining timing of stroboscopic motion in a modifications of the present invention.
Figure 4B:
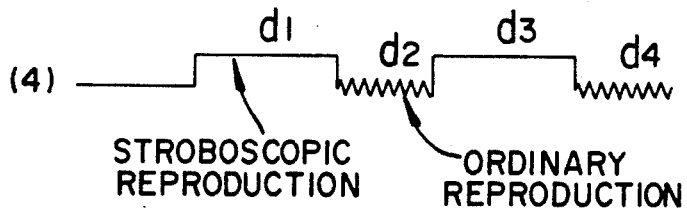
Figure 4C:
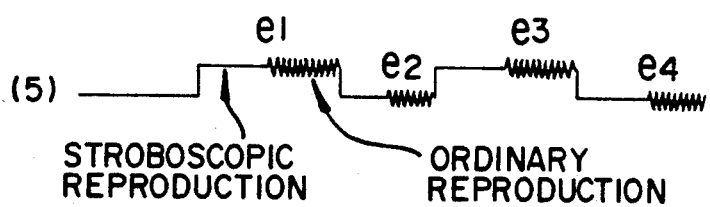

FIGS. 4a to 4c show the operation of the stroboscopic reproduction in modifications of the present embodiment, where the changeover switch 13 is automatically controlled in dependency on the trigger pulses. In one of the modifications, at trigger pulses c1 to c4, the changeover switch 13 is operated to change the terminal with which it is connected. More particularly, when the trigger pulse c1 is fed, the movable contact of the changeover switch 13 is connected to the stroboscopic reproduction terminal 12. At the same time, the digital frame memory 11 produces a video signal, thereby showing a stationary picture for a period d1 in FIG. 4b until the next trigger pulse c2 is fed. At that time, the movable contact of the switch 13 is connected to the ordinary terminal 10 so as to reproduce the video signal in the ordinary manner. Accordingly, the picture in motion is shown on the display 14 for a period d2, that is, until the application of a trigger pulse c3, at which the changeover switch 13 is again operated. Hence the stroboscopic reproduction and ordinary reproduction are repeated by turns.

As shown in FIG. 4c, the present embodiment may be modified to perform stroboscopic effect and ordinary reproduction within each period (e1 to e4) between the trigger pulses c1 to c4. Such variations in operational modes increases the effect of the stroboscopic reproduction.

The present embodiment may be further modified to set the timer to reduce the period of the stroboscopic effect when a high level of the audio signal continues for a predetermined time. Thus the period of the stationary picture is shortened.

Figure 5:
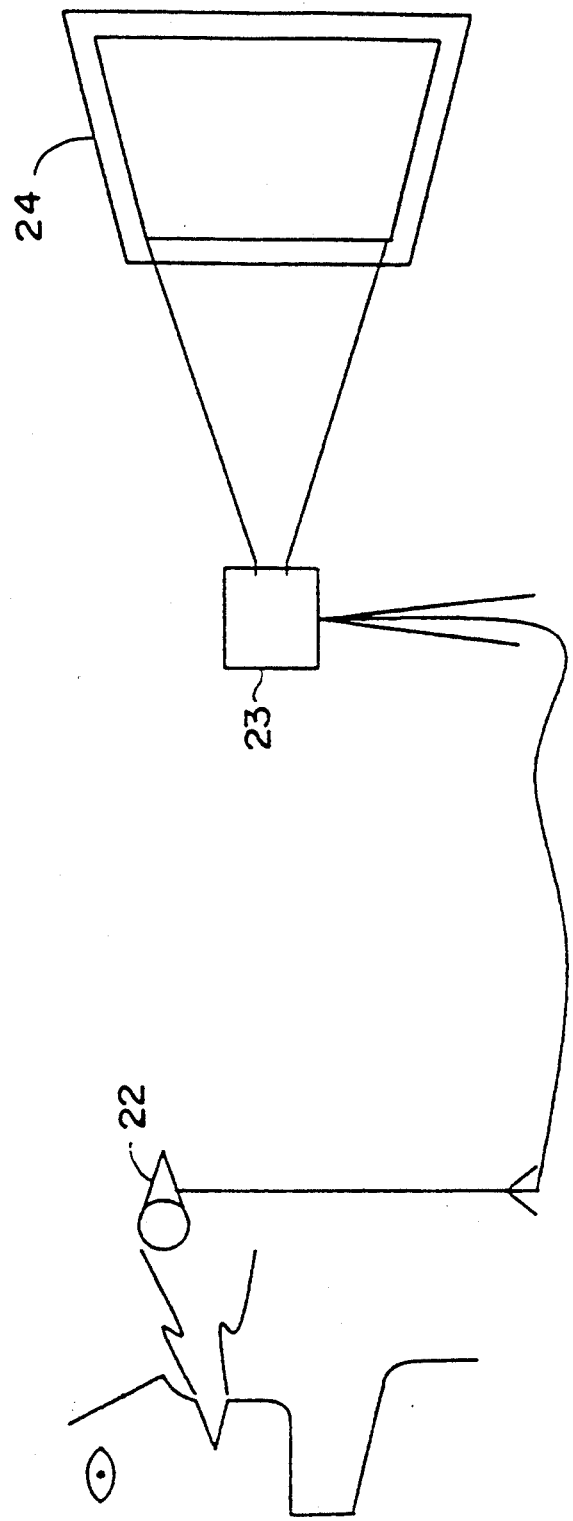
FIG. 5 is a schematic diagram of a video projection system to which the present invention is applied.
Figure 6:
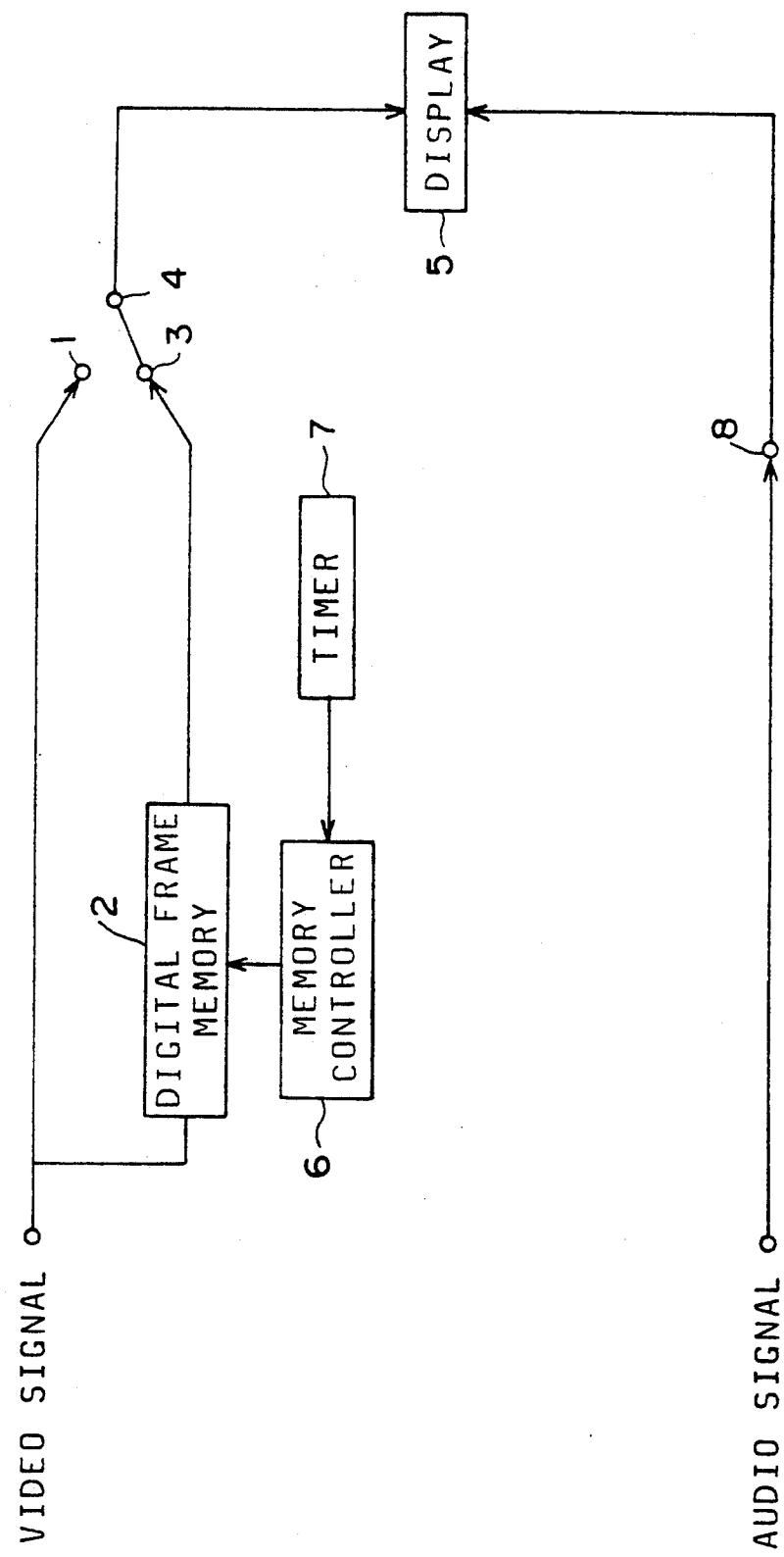
FIG. 6 is a schematic diagram of a conventional video signal reproducing system.

FIG. 5 shows a video production system to which the present invention is applied. The system has a projector 23 which projects pictorial image on a screen 24, and a microphone 22 which picks up the video of a narrator and transmits it to the projector 23. The trigger pulse for starting the stroboscopic effect is generated whenever there is a pause in the narration or when the voice is raised. Hence the narration effectively impresses the audience.

From the foregoing, it will be understood that the present invention provides a video signal reproducing system where the video signal is reproduced in stroboscopic motion in accordance with the sound accompanying the video picture. Hence the pictorial image can be displayed in a impressive manner.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A video signal reproducing system having a video memory for sequentially storing a one frame video signal fed from a source, memory control means for controlling production of a video signal stored in the video memory, and a display for reproducing the video signal produced from the video memory, the system comprising:

detector means for detecting a level of an audio signal; from said source comparator means for comparing a level detected by the detector means with a reference value and for producing a change signal when the level detected by the detector means is higher than the reference value;

said memory control means being responsive to the change signal for producing a trigger signal; and said video memory being responsive to the trigger signal for producing a new video signal stored therein, substituting for a previous video signal which has been reproduced.

2. The system according to claim 1 further comprising a changeover switch for changing the video signal from the video memory to direct a video signal directly fed from the source.

3. A system according to claim 2, wherein the changeover switch is arranged to be responsive to the trigger signal for changing over a connection of contacts thereof.

4. The system according to claim 1 wherein the audio signal includes sounds of a percussion.

5. A system according to claim 1, further comprising audio level setting means for determining the reference value, and an audio level setting key for setting the reference value.

* * * * *